(12) United States Patent
Bala et al.

(10) Patent No.: US 12,518,488 B1
(45) Date of Patent: Jan. 6, 2026

(54) VIRTUAL AVATAR GENERATION

(71) Applicant: Amazon Technologies, Inc., Seattle, WA (US)

(72) Inventors: Raja Bala, Pittsford, NY (US); Yafei Mao, San Jose, CA (US); Hiroyuki Takeda, San Jose, CA (US); Amit Kumar Agrawal, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 163 days.

(21) Appl. No.: 18/541,333

(22) Filed: Dec. 15, 2023

(51) Int. Cl.
| | |
|---|---|
| *G06T 19/00* | (2011.01) |
| *G06T 3/40* | (2024.01) |
| *G06T 7/11* | (2017.01) |
| *G06T 7/60* | (2017.01) |
| *G06T 7/90* | (2017.01) |
| *G06T 15/10* | (2011.01) |
| *G06T 15/50* | (2011.01) |
| *G06T 17/00* | (2006.01) |
| *G06V 10/82* | (2022.01) |
| *G06V 40/16* | (2022.01) |

(52) U.S. Cl.
CPC ............ *G06T 19/00* (2013.01); *G06T 3/40* (2013.01); *G06T 7/11* (2017.01); *G06T 7/60* (2013.01); *G06T 7/90* (2017.01); *G06T 15/10* (2013.01); *G06T 15/506* (2013.01); *G06T 17/00* (2013.01); *G06V 10/82* (2022.01); *G06V 40/171* (2022.01); *G06V 40/172* (2022.01); *G06T 2207/20021* (2013.01); *G06T 2207/20084* (2013.01); *G06T 2207/20092* (2013.01); *G06T 2207/20212* (2013.01); *G06T 2207/30201* (2013.01); *G06T 2210/16* (2013.01)

(58) Field of Classification Search
CPC ... G06T 19/00; G06T 7/11; G06T 7/90; G06T 3/40; G06T 7/60; G06T 15/10; G06T 15/506; G06T 17/00; G06T 2207/20021; G06T 2207/20084; G06T 2207/20092; G06T 2207/20212; G06T 2207/30201; G06T 2210/16; G06V 40/171; G06V 40/172; G06V 10/82
USPC ....................................................... 345/426
See application file for complete search history.

(56) References Cited

U.S. PATENT DOCUMENTS

| | | | |
|---|---|---|---|
| 2002/0093515 A1 | 7/2002 | Fay et al. | |
| 2018/0300927 A1* | 10/2018 | Hushchyn | ............ G06V 40/167 |
| 2019/0035149 A1* | 1/2019 | Chen | ................... G06V 40/166 |
| 2020/0358983 A1* | 11/2020 | Astarabadi | ............. H04N 7/157 |

(Continued)

*Primary Examiner* — David T Welch
(74) *Attorney, Agent, or Firm* — K&L Gates LLP

(57) ABSTRACT

Devices and techniques are generally described for virtual avatar generation using a user-submitted face image. In various examples, first image data including an image of a user face and hair may be received. A first machine learning model may predict a skin tone of skin of the user face in the first image data. Modified first image data may be generated by modifying pixels representing the user face using the predicted skin tone. First segmented image data representing the user face and at least a portion of the hair may be generated. Second image data representing a virtual avatar with a pre-defined head may be generated. First scaled image data may be generated by scaling the modified first segmented image data based at least in part on the virtual avatar. Third image data may be generate by rendering the first scaled image data on a body of the virtual avatar.

18 Claims, 14 Drawing Sheets

(56) References Cited

U.S. PATENT DOCUMENTS

| | | | |
|---|---|---|---|
| 2021/0386307 A1* | 12/2021 | Wu | G06N 3/02 |
| 2022/0207802 A1* | 6/2022 | Troutman | G06T 11/60 |
| 2022/0240779 A1* | 8/2022 | Peyman | A61B 5/0066 |
| 2023/0342487 A1* | 10/2023 | Joseph | G06V 40/166 |
| 2024/0265433 A1* | 8/2024 | Shinde | G06T 19/006 |
| 2024/0404138 A1* | 12/2024 | Zhang | G06T 7/11 |
| 2024/0412432 A1* | 12/2024 | Chung | G06T 11/001 |
| 2024/0428481 A1* | 12/2024 | Rami Koujan | G06F 40/279 |

* cited by examiner

VIRTUAL AVATAR GENERATION

BACKGROUND

Virtual try-on is a computer vision problem related to virtually trying on clothes by rendering virtual representations of clothing items onto an image of the user. Virtual try-on may be used in augmented reality displays to render virtual clothing on a live view of a user. In some other examples, virtual avatars may be generated to represent the user with the virtual clothing item being displayed on the avatar.

DETAILED DESCRIPTION

Figure 1:
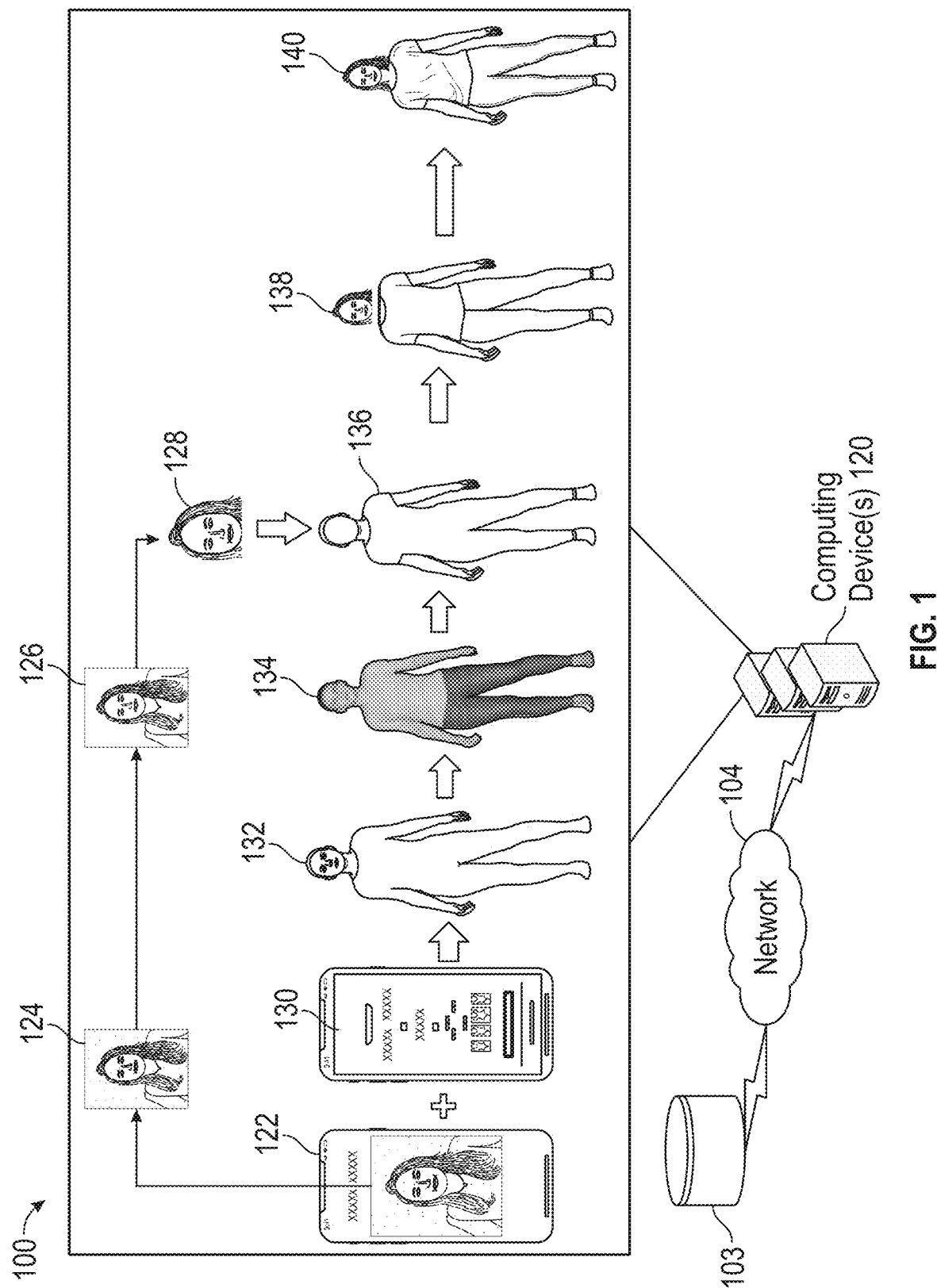
FIG. 1 is a diagram of an example system configured to generate a two-dimensional virtual avatar using a user-submitted image, according to various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Virtual try-on refers to the computer vision task of generating image data simulating how a particular garment or other fashion item (e.g., clothing, sunglasses, handbags, makeup, jewelry, footwear, etc.) would appear when worn by a person. Virtual try-on is useful for online clothing/fashion shopping, where a user may be unable to try on a particular fashion item prior to purchase.

In some examples, it may be useful to generate a realistic virtual avatar of a person having the person's individual visual characteristics so that the person can use virtual try-on to see how a garment or other fashion item of interest might appear when worn by the individual. In this context, it may be important that the virtual avatar have characteristics that are similar to those of the individual so that the user can evaluate the appearance of garments and other fashion items with respect to their individual characteristics. For example, body shape may be important to see how a particular garment fits. In another example, it may be important that the virtual avatar have a skin tone that is similar to the user so that the user can evaluate whether certain colored garments, make-up, and/or other fashion items are visually complementary for their skin tone.

Some previous approaches and/or interfaces for virtual avatar creation require a user to capture an image (e.g., a "selfie") under highly-specific lighting conditions and/or at a particular distance. The specific conditions may be used so that the resulting selfie image which is used in virtual avatar creation may have an accurate skin tone and/or other body characteristics of the user, resulting in a more accurate virtual avatar and/or virtual try-on experience.

However, there is a significant amount of user experience friction in such a process, as some users may be unaware of the effects of lighting color, directionality, shadows, and/or lighting magnitude on the resulting image. In many instances, this can affect qualities such as the skin tone appearance of the virtual avatar. Users may be unlikely to find a virtual avatar with an inaccurate skin tone to be useful in the context of virtual try-on. Additionally, users may not capture images at the correct distance, which may lead to an inaccurate virtual avatar body shape, leading to a dissatisfying virtual try-on experience. Further, the more burdensome the requirements for user-captured images and/or other user inputs required for virtual avatar generation, the more likely a user may be to become frustrated with and/or abandon the process.

Described herein is a novel processing pipeline that may be used to generate realistic two-dimensional virtual avatars based on user-submitted images. Unlike previous approaches, the various virtual avatar generation techniques described herein are able to generate a realistic virtual avatar for 2D virtual garment try-on from as few as a single selfie image and a few user-submitted body characteristics. In addition, the techniques described herein are able to relax the requirements on user image capture using novel skin-tone detection and correction techniques to correct for skin-tone inaccuracies caused by poor or less-than-ideal lighting conditions. Additional novel techniques are used to scale the size of the user's head from their user-submitted selfie image to an appropriate, realistic size for stitching onto a 2D image of a body model, where the body model is generated based on a few user-submitted body characteristics. Furthermore, generative machine learning approaches are used to perform photorealistic in-filling and rendering of the virtual avatar. This enables the user's selfie image to be combined with the body model in a photorealistic way that conforms to the user's skin tone. Additionally, this renders pixels of the body model representing exposed skin (e.g., the arms of the body model) with the accurate skin tone. Additionally, the generative model (e.g., a generative machine learning model) is able to render the user's hair in a natural photorealistic way that both conforms to the appearance of the user's hair in the selfie image, but in a way that avoids occlusion of clothing on the body model (making the virtual avatar useful for the virtual try-on task).

Unlike existing approaches, these processing techniques are able to generate realistic 2D virtual avatars with accurate skin tone, from a single selfie image, in spite of widely differing lighting conditions under which the selfie image was captured. Further, the various systems and techniques described herein are able to overcome technical challenges associated with stitching face and head image data onto a body model in a photorealistic and skin tone-accurate way.

Various techniques described herein employ image segmentation. Segmentation of image data includes separation of pixels determined to pertain to one part of an environment (or one class) from pixels determined to pertain to another part of the environment (or other class). For example, a person standing in the foreground of an image may be segmented from the background environment or an article of clothing being held may be segmented from the person holding the article using segmentation techniques. In various examples described herein, semantic segmentation may be used to determine pixels of an input image pertaining to a users' face skin (for lighting-based skin tone correction) and/or pixels of an input image pertaining to the combination of the user's face and hair (e.g., for stitching the user's head onto an image of a body of a virtual avatar generated in accordance with user-submitted body characteristics). Segmentation techniques may generate segmentation masks that denote the segmentation class of each pixel of an image (e.g., "foreground" or "background"). Additionally, convolutional neural networks (CNNs) and/or other machine learning models can be used to classify types and/or classes of objects. For example, a convolutional neural network may be used to detect and classify objects (e.g., faces, heads) present in image data (e.g., objects corresponding to classes for which the convolutional neural network (CNN) has been trained).

In various examples, generative adversarial networks (GANs) may be trained using the various techniques described herein to generate synthetic image data (e.g., an image of a model wearing a garment). In GANs, a generator is trained to generate synthetic image data based on input data (e.g., based on a vector input and/or input image data). The generator is trained to map data from a latent space to a particular data distribution of interest. A discriminator is used to discriminate between images from the true distribution (e.g., from natural image data captured using a camera device) and synthetic image data produced by the generator. Training instances may include ground truth data indicating whether the image is "real" (e.g., natural) or "fake" (e.g., synthetically generated). The training goal of the generator is to increase the error rate of the discriminator (e.g., to generate synthetic image data that appears to be of the true distribution). Back propagation is used in both the generator and the discriminator networks so that the quality of synthetic image data produced by the generator is increased while the discriminator network becomes better at distinguishing between true data and synthetic data produced by the generator. In various examples, the generator may be a deconvolutional neural network and the discriminator may be a CNN.

As described herein, synthetic or "fake" data may refer to data generated by a generator of a GAN. Conversely, data input to a trained generator for transformation (e.g., for removal of photometric artifacts and/or for pose alignment) may be referred to herein as "real" or "natural" image data (e.g., input RGB image data). In some examples described herein, conditional GANs may be used to condition the generative process to preserve certain parts of an input image, while modifying other parts. For example, as described herein a conditional GAN (such as StyleGAN2) may be conditioned to preserve limb shape, a face, partial hair, and garments of an input image. The conditional GAN may further be conditioned to perform an infilling task conditioned on a detected skin tone that is predicted from the user-submitted image (e.g., a user selfie). Although some implementations described herein use GANs for generative image processing tasks, it should be noted that other generative models may be used. For example, a conditional latent diffusion model may be used instead of a conditional GAN.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

A skinned multi-person linear (SMPL) model is a realistic 3D model of the human body. SMPL takes pose parameters $\theta \in \mathbb{R}^{72}$ for 3D angles of joints and root orientation and shape parameters $\beta \in \mathbb{R}^{10}$ to control shape of torso and limbs as input. SMPL outputs dense body mesh 3D vertices $M \in \mathbb{R}^{6890 \times 3}$ and 24 3D human joints (e.g., joint data) of interest from linear combination of dense vertices: $J \in \mathbb{R}^{24 \times 3} = WM$, where W is the linear regressor.

The skinned multi-person linear (SMPL) model is a realistic model of the human body. The SMPL body may be projected into the 2D image plane by multiplying by a projection matrix $K_{2\times 3}$ for orthographic projection.

$$K = \begin{bmatrix} s & 0 & t_x \\ 0 & s & t_y \end{bmatrix} \quad (1)$$

where K is parameterized by scale s and 2D horizontal and vertical translation ($t_x$, $t_y$). Rotation is not needed in projection matrix, as the first three values in SMPL pose parameter θ represent global rotation. Although many examples describe use of the SMPL model, it is to be understood that other 3D human body models such as SMPL-X, STAR, SUPR may be used in its place.

FIG. 1 is a diagram of an example system 100 configured to generate a two-dimensional virtual avatar using a user-submitted image, according to various aspects of the present disclosure. As depicted in FIG. 1, computing device(s) 120 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to perform the various virtual avatar generation techniques, machine learning models, algorithms for training the machine learning models, parameters for the various machine learning models, training datasets, etc. In various examples, a user device (e.g., a smart phone, tablet, camera, and/or other device), such as the user device used to capture image data 122 (e.g., a selfie image) may be configured to communicate with the computing device(s) 120 over network 104.

In the example of FIG. 1, a user may use a user device (e.g., a smartphone) to capture image data 122 (e.g., a selfie) that depicts the user's face and hair. Notably, the image data 122 may be used for the generation of virtual avatar 140 even if captured under less-than-ideal lighting conditions. In some examples, a mobile and/or web-application associated with the virtual avatar generation and/or virtual try-on may be used to capture the image data 122 and may guide the user on how to capture the image data 122. Additionally, in various examples, the application may provide an interface 130 that may prompt the user to enter various characteristics that may be used to generate a SMPL model representing the user's body. Characteristics may include one or more of the user's height and weight. Additionally, the interface 130 may include a series of sliders for different body proportions that may affect different parameters used in generation of the SMPL model. The sliders may include sliders for one or more of hip size/shape, chest circumference, hip circumference, inseam/leg length, etc. Additionally, the interface may employ guard-rails for the various body measurement combinations to ensure that realistic human body shapes are generated. In various examples, different poses may be used for generation of the SMPL model. In some cases, characteristics input using the interface 130 may be used to affect the input SMPL parameters, which may, in turn, affect the pose of the SMPL model. For example, an angle of the shoulder and/or armpit of the SMPL model may be changed based on a body-mass index calculated using user-input height and weight in order to render a more realistic SMPL model.

In some cases, the pose of the human model (e.g., the SMPL model) may be varied for different garments selected for virtual try-on. For example, a designer and/or manufacturer of the garment may specify one or more poses that may highlight the garment in the most (subjectively) flattering way. In some cases, the pose of the SMPL model may be modified to be similar to a pose of a model wearing the garment (e.g., provided by the designer/manufacturer on an item detail page). In some examples, the pose of the SMPL model may be selected for ease of downstream, virtual try-on processing. For example, some virtual try-on algorithms may have difficulty realistically rendering pants, dresses, and/or skirts on a human model when the human model is posed with its legs crossed. Accordingly, poses for the SMPL model may be selected to avoid such "difficult" poses in order to provide higher quality virtual try-on experiences.

The slider selections and/or input body characteristics may be parameterized and used to generate a SMPL model 132 (e.g., a SMPL expressive (SMPL-X)) which may be a generic 3D mesh of a natural human body generated in accordance with the user-submitted characteristics. A frontal 2D image of the SMPL model 132 (body image 134) may be generated by rendering the SMPL model 132 with a generic face and clothing (e.g., default face and clothing, user-selected generic face and clothing, etc.). As shown in the body image 134, some portions of the body's skin are visible (e.g., neck and arms). Accordingly, when combining the user's head and face from the image data 122 with the body image 134, it may be important to render these portions of the body image 134 with the user's skin tone. Techniques used to realistically infill these portions of the body image 134 are described in further detail below in reference to FIGS. 7A-7C.

The user-submitted image data 122 may be cropped (in some examples) to generate image data 124. Image data 124 may be input into a supervised, deep learning classifier trained to detect the lighting conditions and true user skin tone of the image data 124. The detected skin tone may be used to modify detected skin pixels and generate the image data 126 reflecting a more accurate representation of the user's skin tone (that accounts for the lighting detected in the user-submitted image data 122). Skin tone detection and correction techniques are described in further detail below in reference to FIGS. 2A-2C. Image segmentation may be used to generate image data 128 comprising an image of the user's face and hair.

However, since the user-submitted image data 122 may be captured at any distance and/or zoom setting, the size of the user's head in image data 128 may vary greatly. Accordingly, the image data 128 may be scaled prior to stitching the image data 128 onto the body image 136 so that the user's head image data 128 appears realistic in size when combined with the body image 136. Scaling of the user-submitted image is described in further detail below in reference to FIGS. 3A-3C and 4. The user-submitted head image data 128 (after scaling) may be aligned with the body image 136 (e.g., using keypoint alignment) to generate a 2D image of a virtual avatar 138. However, the virtual avatar 138 may have inconsistencies in skin tone (e.g., the arms and/or neck of the SMPL model may have different skin tone relative to the stitched user's face) and/or the user's head may look unrealistic on the neck of the SMPL model. Accordingly, after scaling and stitching the user-submitted head image onto the image of the SMPL model (e.g., body image 136) to generate virtual avatar 138, a generative model may be used to infill gaps (e.g., gaps between the user-submitted image of the user's head/face and the body of the SMPL model) with realistic skin tone and to make the skin tone of the skin of the SMPL model consistent with the user's skin tone. The photorealistic infilling and rendering, using generative AI, is described in further detail below in reference to FIGS. 7A-7C. After infilling/photorealistic rendering, the output 2D image of the virtual avatar 140 may be generated which may be a realistic representation of the user, including the user's face (from the user-submitted selfie image), and an accurate skin tone for the user.

Figure 2A:
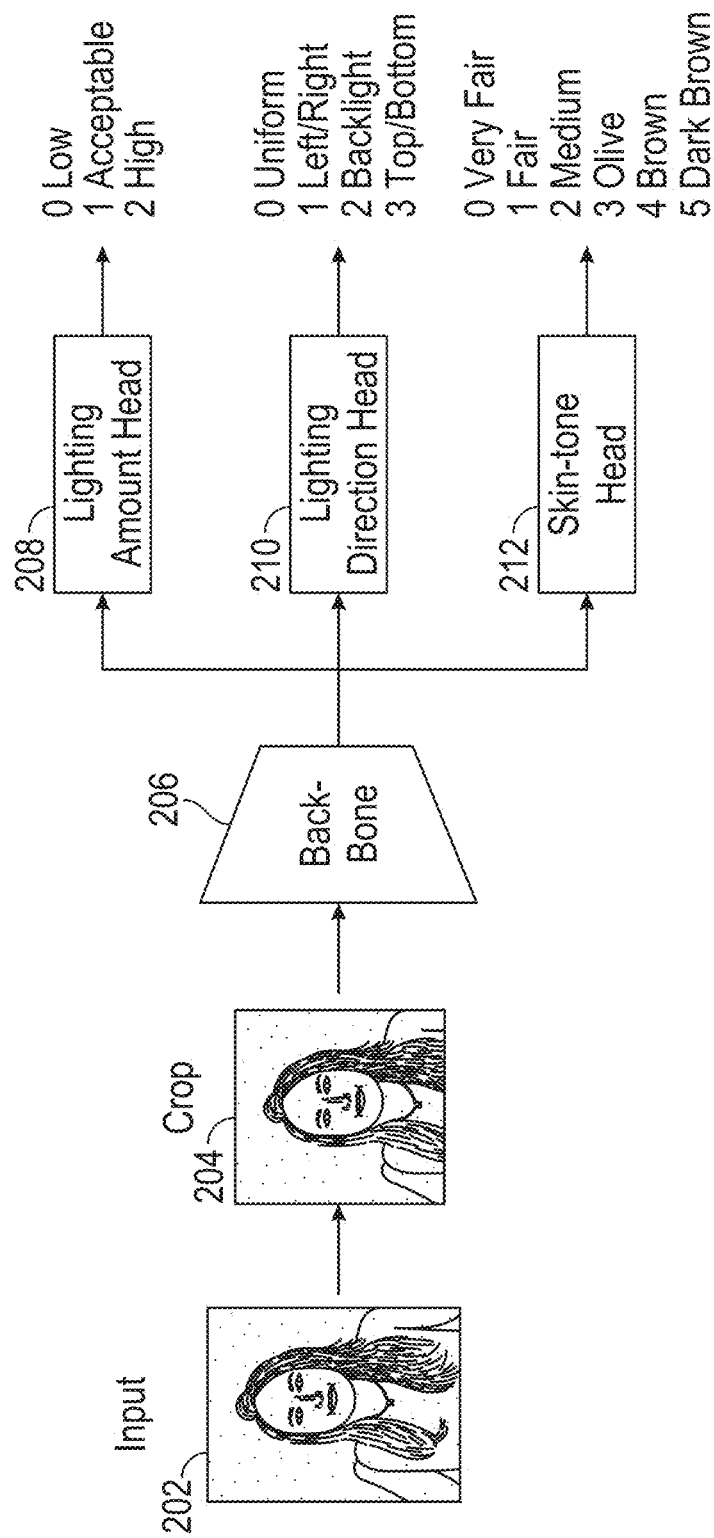
FIG. 2A depicts example of a machine learning architecture used to detect skin tone in image data, in accordance with various aspects of the present disclosure.

FIG. 2A depicts example of a machine learning architecture used to detect skin tone in image data, in accordance with various aspects of the present disclosure. Input image 202 may be the user-submitted image captured by the user (e.g., from within the mobile and/or web-based application used to generate the virtual avatar). In various examples, this input image 202 may be cropped (block 204) to be of expected dimensions (e.g., in terms of image frame size) for input into the backbone encoder 206.

Backbone encoder 206 may be implemented using any desired image encoding architecture. For example, backbone encoder 206 may be a CNN (e.g., ResNet-50 or similar), a transformer-based image encoder, etc. The backbone encoder 206 may generate dense feature representations of the input images (e.g., high dimensional vectors that represent visual information and/or semantic information in the input image). In the architecture depicted in FIG. 2A, three different classifier heads are used to classify the encoded image representations output by the backbone encoder 206. Each of the three classifier heads may include one or more fully-connected layers and may be trained either end-to-end with the backbone encoder 206 or separately to classify input images. For example, classifier head 208 may predict a lighting magnitude of the input image. In the example of FIG. 2A, the classifier head 208 may predict that the lighting in the input image is low, acceptable, or high. Classifier head 208 may learn to predict these classes from labeled training data (e.g., example selfie images annotated with "low", "acceptable", or "high" lighting magnitude labels).

Similarly, classifier head 210 may predict a lighting direction for the input image. In the example of FIG. 2A, the classifier head 208 may predict that the lighting direction is uniform, from the left or right, backlight (e.g., behind the user), top/bottom (lighting below or above the user). Classifier head 210 may learn to predict these classes from labeled training data (e.g., example selfie images annotated with labels corresponding to the applicable lighting direction).

Similarly, classifier head 212 may predict a skin tone for the user in the input image 202. The appearance of the skin tone varies according to the lighting amount and lighting direction. Accordingly, training the backbone encoder 206 and/or the classifier heads 208, 210, and 212 together may enable the backbone encoder 206 to learn to encode the associations between skin tone, lighting amount, and lighting direction. In an example, the classifier head 212 may predict one of the Fitzpatrick scale skin tones (from type 0 (very fair) to type 6 (dark brown). It should be noted that other prediction classes may be used in accordance with the desired implementation. Similarly to classifier heads 208, 210, classifier head 212 may be trained using selfie images labeled with the appropriate skin tone class (e.g., with a skin tone type from the Fitzpatrick scale according to the skin tone of the individual in the training image).

Figure 2B:
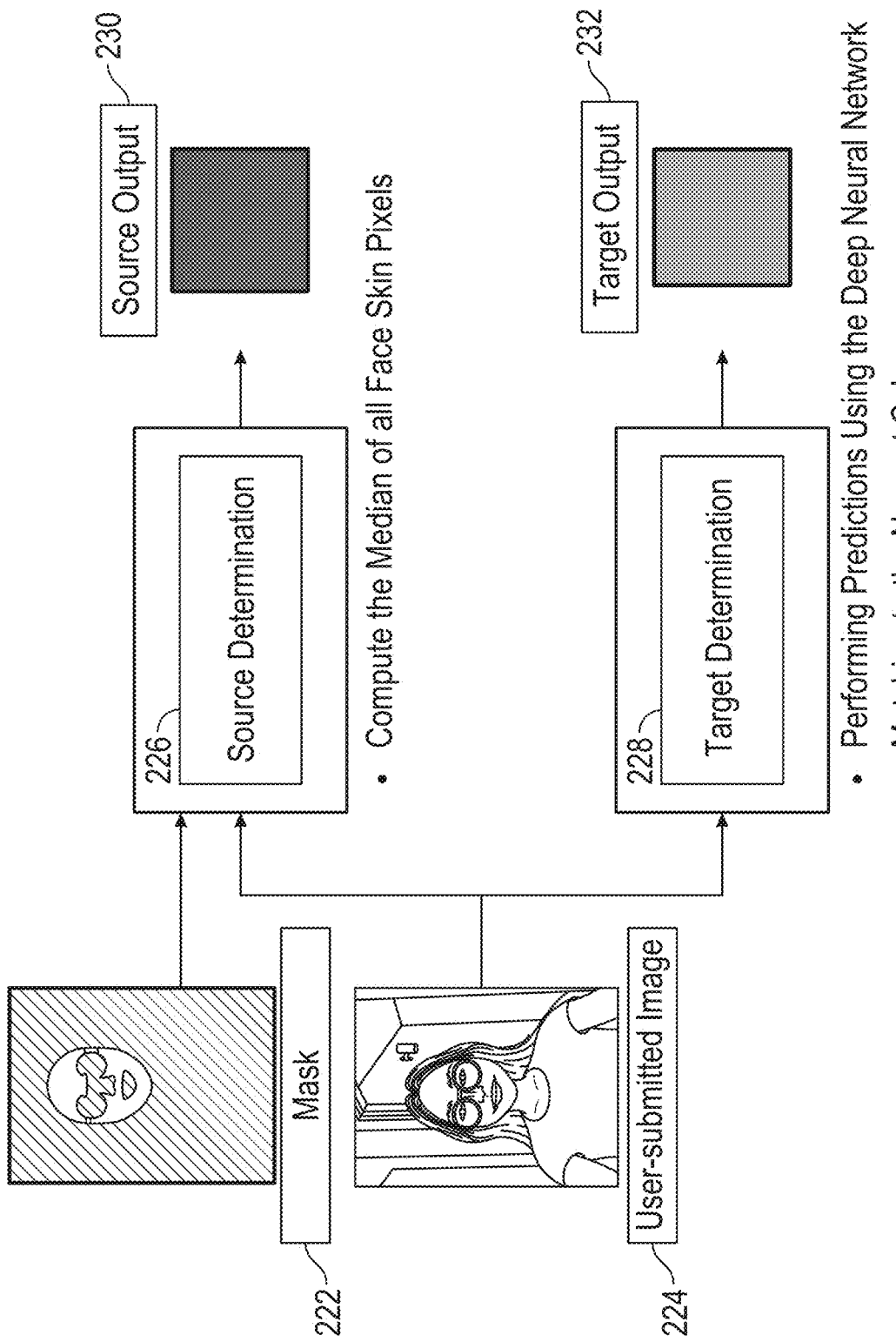
FIG. 2B depicts an example of determination of lighting correction for skin tone, in accordance with various aspects of the present disclosure.

FIG. 2B depicts an example of determination of lighting correction for skin tone, in accordance with various aspects of the present disclosure. FIG. 2B depicts an example of a user-submitted image 224 (e.g., a selfie). In this example, the lighting in the user-submitted image 224 may be relatively low which may result in inaccurate skin tone for the user. A segmentation model may be trained to generate a segmentation mask 222 representing pixels in the user-submitted images (including user-submitted image 224) that represent skin of the user's face. At source determination 226 a source skin tone may be determined from face skin pixels in the user-submitted image 224 (determined using the segmentation mask 222). The median pixel value of all face skin pixels may be used as a representative example of the skin tone in the user-submitted image 224 (e.g., "source output 230"). This may be used for lighting correction for skin tone as a reference value.

Target determination 228 may be the deep neural network model illustrated in FIG. 2A and may be used to predict the actual skin tone of the user (e.g., the target output 232, which may be predicted based on the predicted lighting and predicted lighting direction).

Figure 2C:
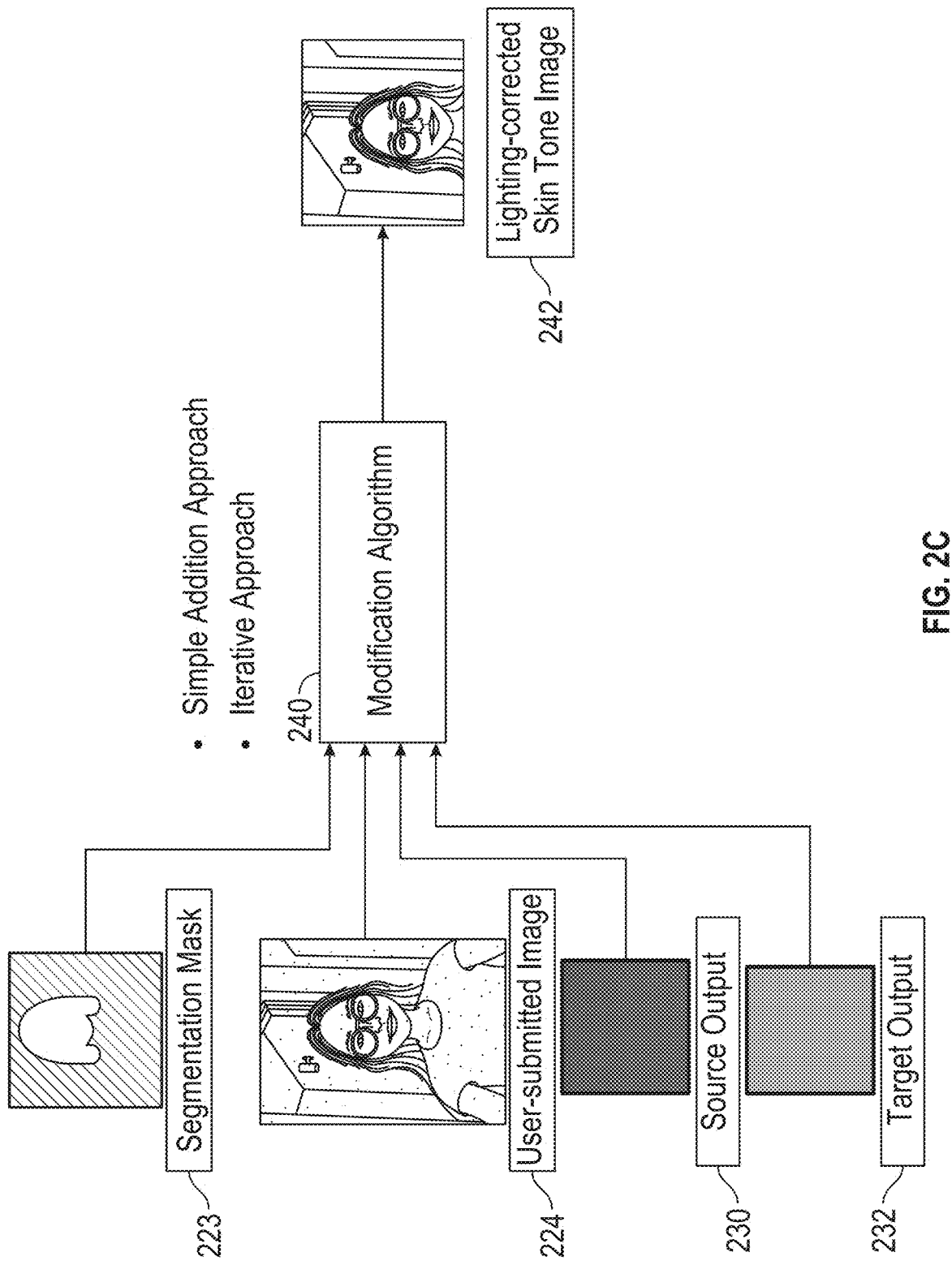
FIG. 2C depicts an example of generation of lighting corrected skin tone, in accordance with various aspects of the present disclosure.

FIG. 2C depicts an example of generation of lighting corrected skin tone, in accordance with various aspects of the present disclosure. In FIG. 2C another segmentation model may be trained to generate a segmentation mask 223 representing pixels of the user's face and at least a portion of their hair (e.g., a segmentation model that generates a mask for pixels representing the user's head). This segmentation mask 223 may be applied to the user-submitted image 224 (resulting in an image where only the pixel values of the user-submitted image 224 that correspond to the face/hair pixels are represented and the other pixels are set to 0 (or 1, depending on the implementation).

The source output 230 may be a pixel value representing a color detected in the user-submitted image 224 and may be determined as described in FIG. 2B. The target output 232 may be a different pixel value representing a target skin tone (color). The difference between these two pixel values (the source output 230 and the target output 232) may be determined. Modification algorithm 240 may include adding the absolute value of this difference value to each pixel in the face-hair image generated by applying the segmentation mask 223 to the user-submitted image 224. The result may be a lighting-corrected skin tone image 242 which may accurately reflect the skin tone (and/or hair color) of the user under adequate, uniform lighting. Image data 126 of FIG. 1 may be an example of such a lighting-corrected skin tone image 242.

Figure 3A:
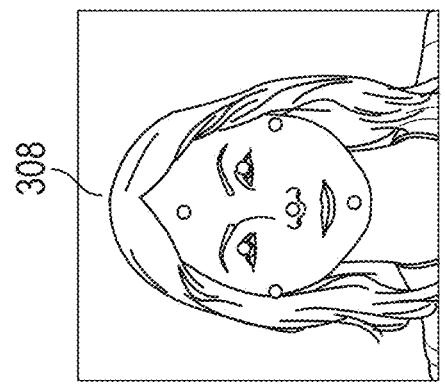
FIG. 3A depicts a first example approach for head-body scaling, in accordance with various aspects of the present disclosure.
Figure 3A:
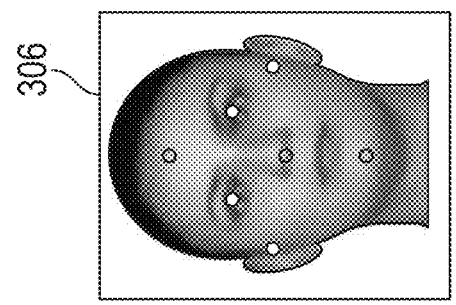
Figure 3A:
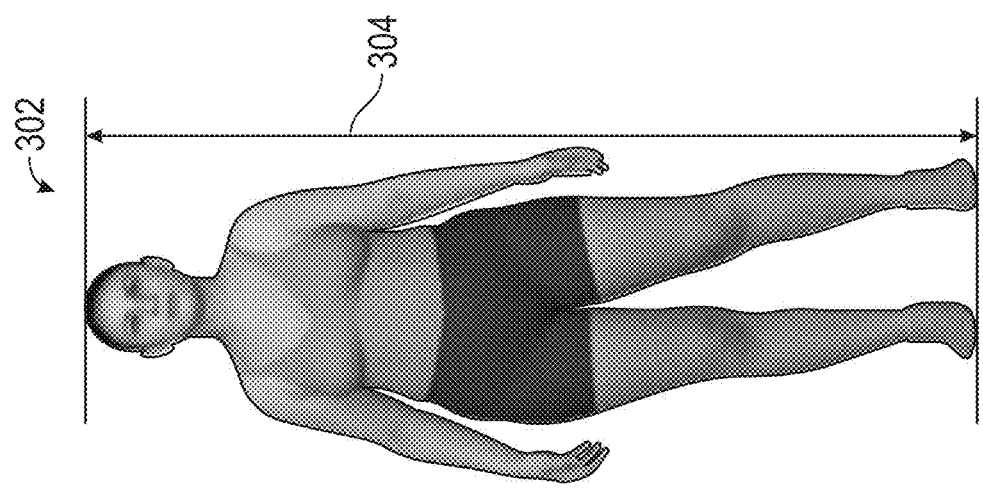

FIG. 3A depicts a first example approach for head-body scaling, in accordance with various aspects of the present disclosure. The size of the user's face and head in the user-submitted image (e.g., in the lighting-corrected skin tone image 242) may be highly variable based on the zoom level, camera resolution, and/or the distance between the user and the camera. Accordingly, if the segmented image of the user's head were to be directly stitched onto the SMPL model (in place of the generic head of the SMPL model), it may result in an abnormal looking avatar (with a head that may be either too large or too small relative to the body).

FIGS. 3A-3C and 4 depict various techniques that may be used to scale the image of the user's head to the appropriate size before stitching onto the body of the SMPL model. FIG. 3A depicts the SMPL model 302. The height 304 of the SMPL model, in terms of a number of pixels, may be determined. Image 306 is an image of the generic head of a SMPL model (generated based on the user input height, weight, and/or other characteristics, as described above) having a plurality of keypoint pairs (e.g., left ear and right ear, left eye and right eye, chin and middle of hairline, etc.). Similarly, image 308 may be the hair/face segmentation mask of the user-submitted image (before or after skin tone correction). A first keypoint pair (e.g., left ear, right ear) on the image 306 and the corresponding second keypoint pair (left ear, right ear) on the image 308 may be used to determine a scaling factor between the image 308 and the image 306. This scaling factor may be multiplied by the "selfie" face width in pixels (e.g., the width, in pixels, of the face in the image 308) to determine the face width of the face of the SMPL model (the face in image 306) in terms of a number of pixels.

In other words:

$$SMPL_{face\_width\_in\_pixels} = scale_{estimated\_from\_keypoint\_pairs} * Selfie_{face\_width\_in\_pixels}$$

The selfie face width in units of distance (e.g., cm, inches, etc.) may be determined as:

$$\text{Face width in cm} = \frac{SMPL_{face\_width\_in\_pixels}}{\text{Avatar height in pixels}} \cdot \text{User input height in cm}$$

Figure 3B:
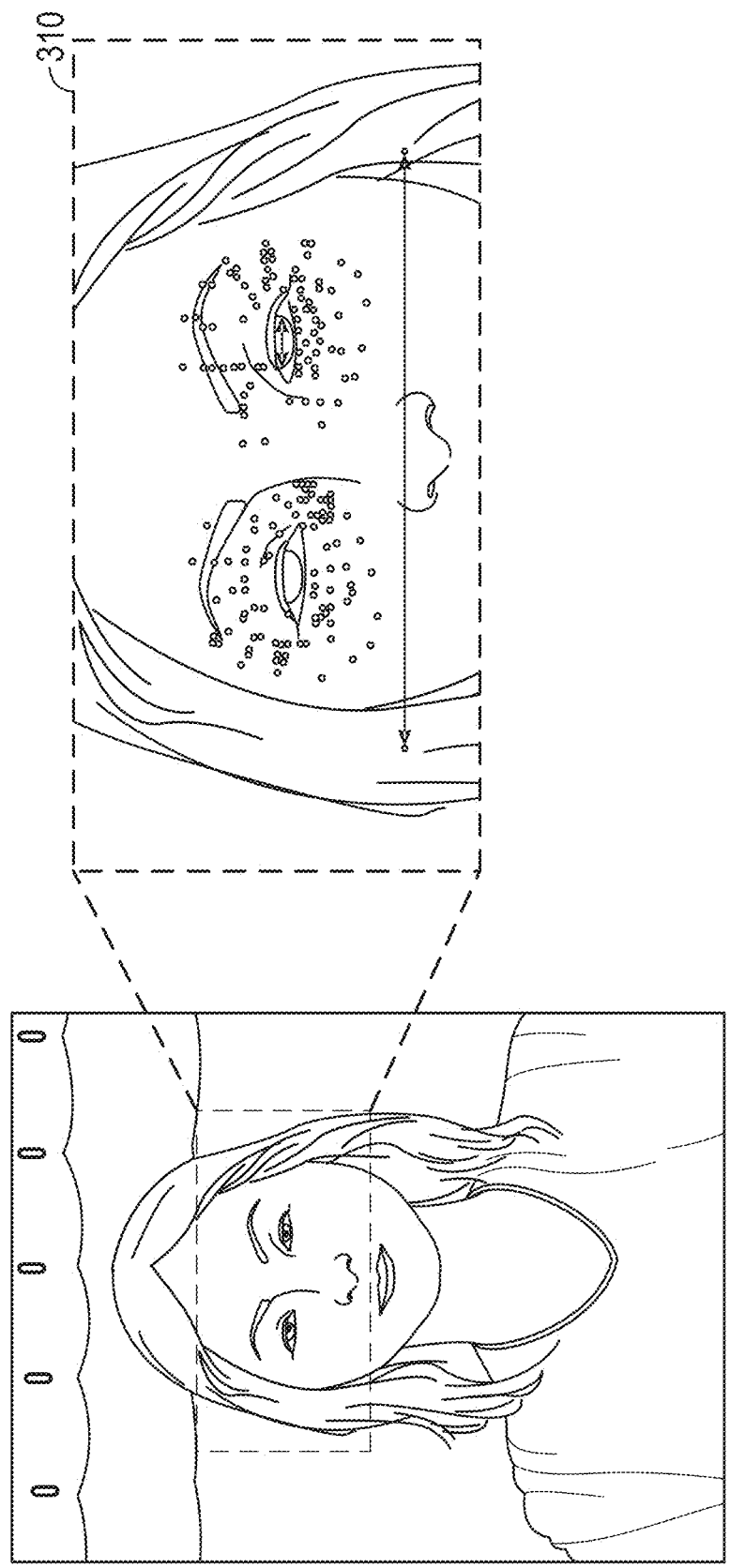
FIG. 3B depicts a detection of iris width in user-submitted image data, in accordance with various aspects of the present disclosure.
Figure 3C:
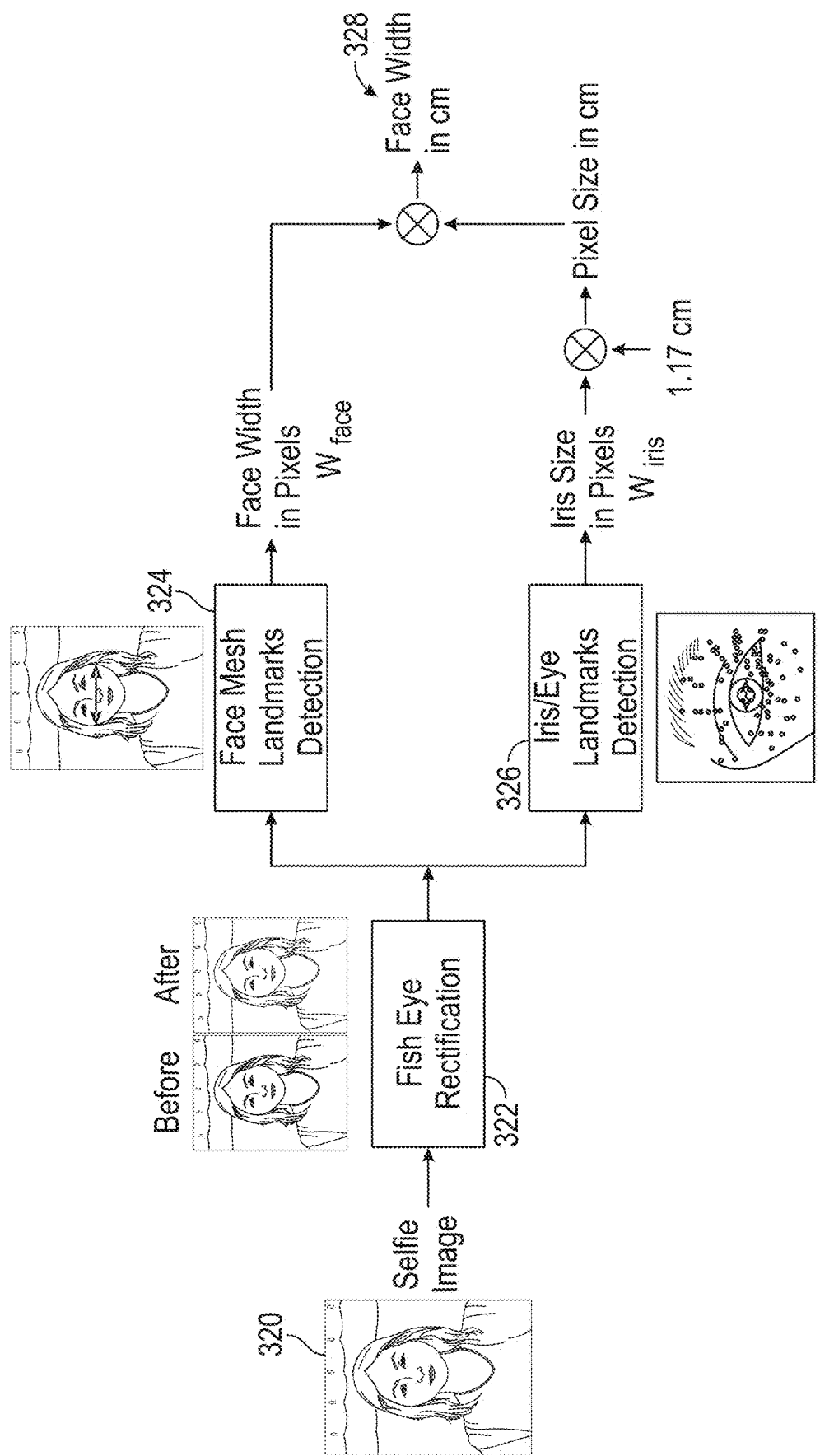
FIG. 3C depicts processing steps for approximating a face width in units of distance based on a user-submitted image and human iris width, in accordance with various aspects of the present disclosure.

This estimate of the user face width (in cm or other units of distance) may be used alone to generate a scaling factor or may be combined with the technique described in FIGS. 3B-3C.

FIG. 3B depicts a detection of iris width in user-submitted image data, in accordance with various aspects of the present disclosure. In image 310 (e.g., part of the user-submitted image data (i.e., the selfie)), the width of the iris of the eye (in terms of a number of pixels) may be detected using known computer vision techniques. It has been reported that the width of a human iris, irrespective of other body dimensions, is approximately 11.7 mm. This known information can be used as a pre-defined iris width to determine a width of the user's face from the selfie image, as described in FIG. 3C.

FIG. 3C depicts processing steps for approximating a face width in units of distance based on a user-submitted image 320 and human iris width, in accordance with various aspects of the present disclosure. It should be noted that the techniques in FIG. 3C may be performed on the segmented head from the user-submitted image 320 (e.g., generated using a hair/face segmentation mask (such as segmentation mask 223)) or on the original selfie image, depending on the desired implementation. In various examples, fish-eye rectification 322 may initially be performed to correct for any fish eye effects. Thereafter, landmarks on the user's face in the user-submitted image 320 (e.g., left ear, right ear) may be used to determine the user's face width in pixels from the image ($w_{face}$) (block 324). Similarly, computer vision may be used to detect the width, in pixels, of the iris ($w_{iris}$ at block 326). The width of the iris in units of distance (1.17 cm) may be divided by the iris width in pixels ($w_{iris}$) to determine the width of a single pixel in cm ("Pixel size in cm" in FIG. 3C). This may be multiplied by the face width in pixels ($w_{face}$) to generate the face width in units of distance 328 (cm in the example depicted in FIG. 3C). As with the technique for determining face width from FIG. 3A, the face width in units of distance 328 may be used alone or may be combined with the face width from FIG. 3A by determining an average of the two values to determine a final face width in units of distance.

Figure 4:
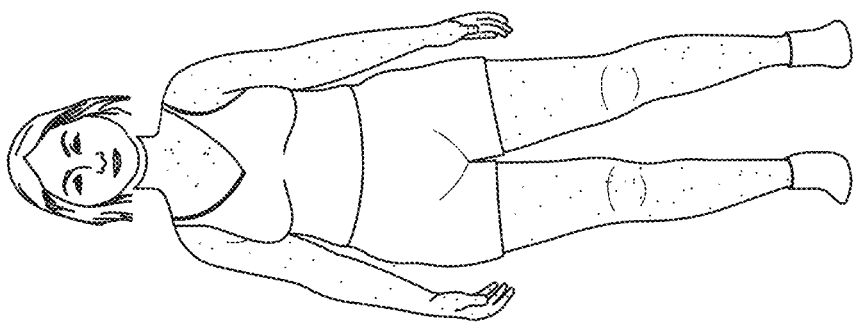
FIG. 4 depicts scaling of a user-submitted image and stitching onto a two-dimensional rendering of a body model, in accordance with various aspects of the present disclosure.
Figure 4:

FIG. 4 depicts scaling of a user-submitted image and stitching onto a two-dimensional rendering of a body model, in accordance with various aspects of the present disclosure. Using the final face width (e.g., in cm) determined from either FIG. 3A or FIG. 3C (or the average of the two), the desired face width in pixels may be computed as:

$$\text{Target face width in pixels} = \frac{\text{Face width in cm}}{\text{User input height in cm}} \cdot \text{avatar height in pixels}$$

Where the avatar height in pixels refers to the height of the photo rendering of the SMPL model (including the generic head).

A scaling factor may be determined using:

$$\text{Scaling factor} = \frac{\text{Target face width in pixels}}{\text{Selfie face width in pixels}}$$

This scaling factor is used to resize the selfie image in height and width before stitching with the avatar's body. For example, if the scaling factor is 0.5, then the selfie image may be resized to half its original height and width. If the scaling factor is 1.5, the selfie image may be resized to be 50% larger in both dimensions. The scaling factor may be applied to the user-submitted image 402 to scale the image to generate the scaled image 404 prior to stitching the face-hair segmentation mask of the scaled image 404 onto the SMPL model (e.g., in place of the generic SMPL head). Note that the scaling may be performed before or after skin tone correction and may be performed prior to or after face/hair segmentation, depending on the desired implementation.

Although FIGS. 3A-3C and FIG. 4 describe example techniques for detection of face width in user-submitted images and scaling of user-submitted images for stitching onto a two-dimensional rendering of a body model, other approaches may also be used for head-to-body scaling. In another example, a machine learning model may be used to regress the face width from user-input body dimensions (e.g., input via interface 130) such as one or more of chest circumference, waist circumference, hip circumference, height, weight, etc. For example, a neural network may be trained to predict face width (e.g., in units of length) based on training examples that include user-input body dimensions paired with a ground truth face width (for an individual with those body dimensions).

Figure 5:
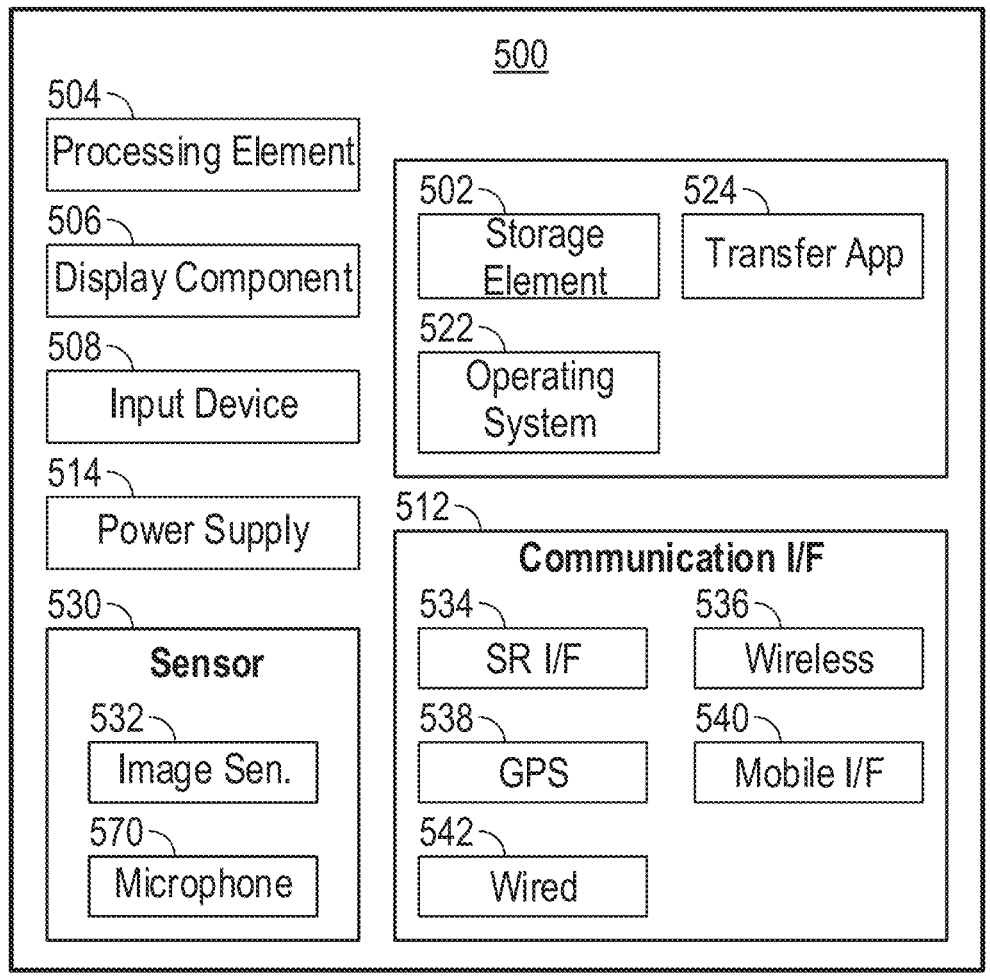
FIG. 5 is a block diagrams showing an example architecture of a computing device that may be used in accordance with various embodiments described herein.

FIG. 5 is a block diagram showing an example architecture 500 of a computing device that may be used during virtual avatar generation, in accordance with various aspects of the present disclosure. For example, the computing device of FIG. 5 may execute the companion application used to capture the selfie of the user and/or to provide the user's body characteristics, for SMPL model generation. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D pose image data generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
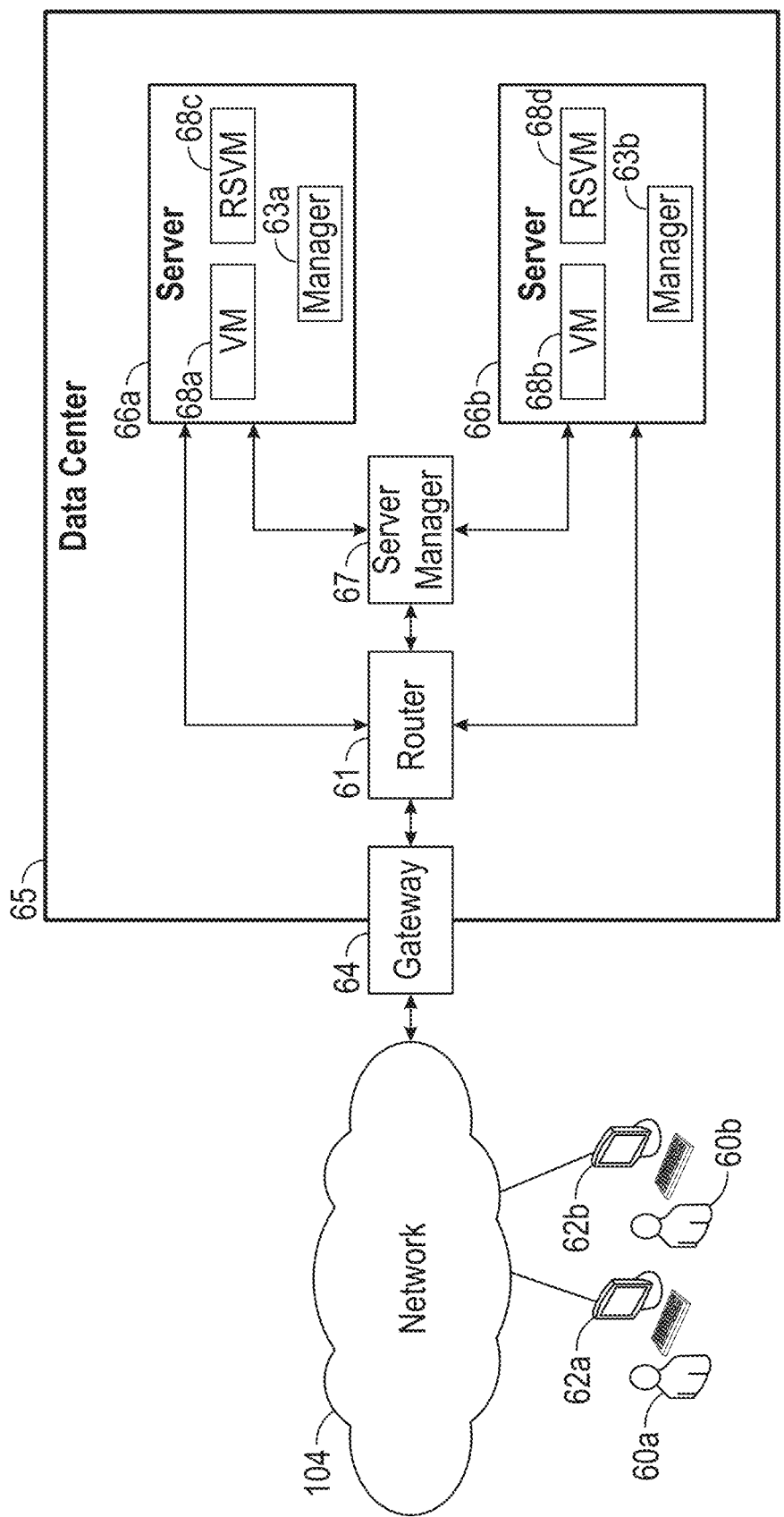
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide virtual avatar generation as a service over a network wherein one or more of the techniques described herein may be requested by a first computing device and may be performed by one or more different computing devices configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various virtual avatar generation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7A:
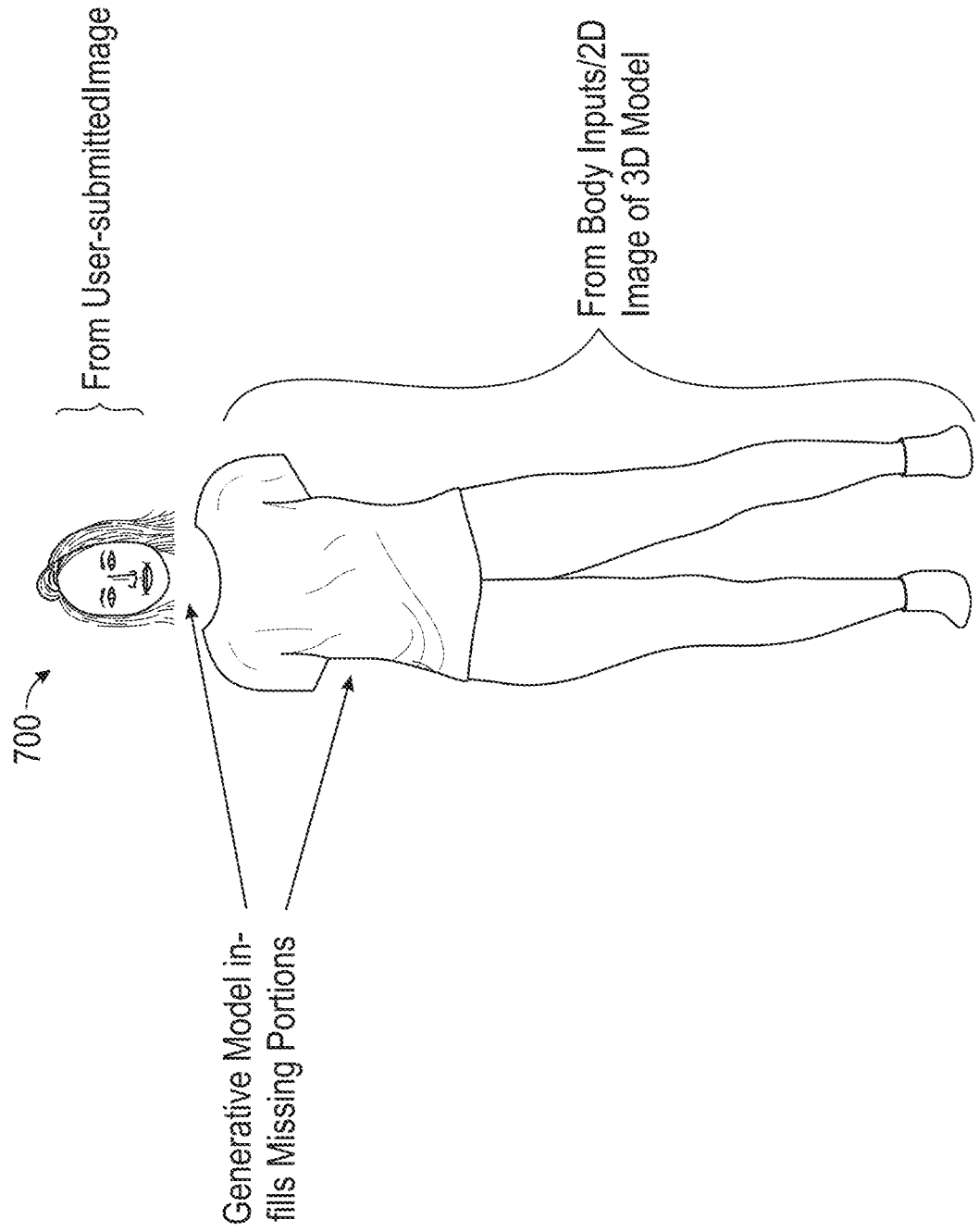
FIG. 7A depicts a portion of a user-submitted image stitched onto a body model with gaps in the stitching, in accordance with various aspects of the present disclosure.

FIG. 7A depicts a portion of a user-submitted image stitched onto a body model with gaps in the stitching, in accordance with various aspects of the present disclosure. After aligning the skin tone corrected and scaled user-submitted image with the body of the SMPL model, an image may be generated that masks out the skin of the SMPL model, showing only the generic clothing and the user-submitted face image (after skin tone correction and scaling) as shown in FIG. 7A. As described below, a generative model may be used to infill and photorealistically render the skin of the SMPL model according to the user's skin tone and so that the user's hair does not occlude the clothing of the SMPL model. Although not specifically shown in FIG. 7A, in some examples, a pre-processing step may include increasing a transparency of the user's hair in the selfie image as the hair approaches the bottom of the user's face (e.g., the chin and neck area). This may enable the generative AI model (described in further detail below) to render a more realistic-looking representation of the hair descending below the chin line, without obscuring the infilled neck and/or garments of the body model.

Figure 7B:
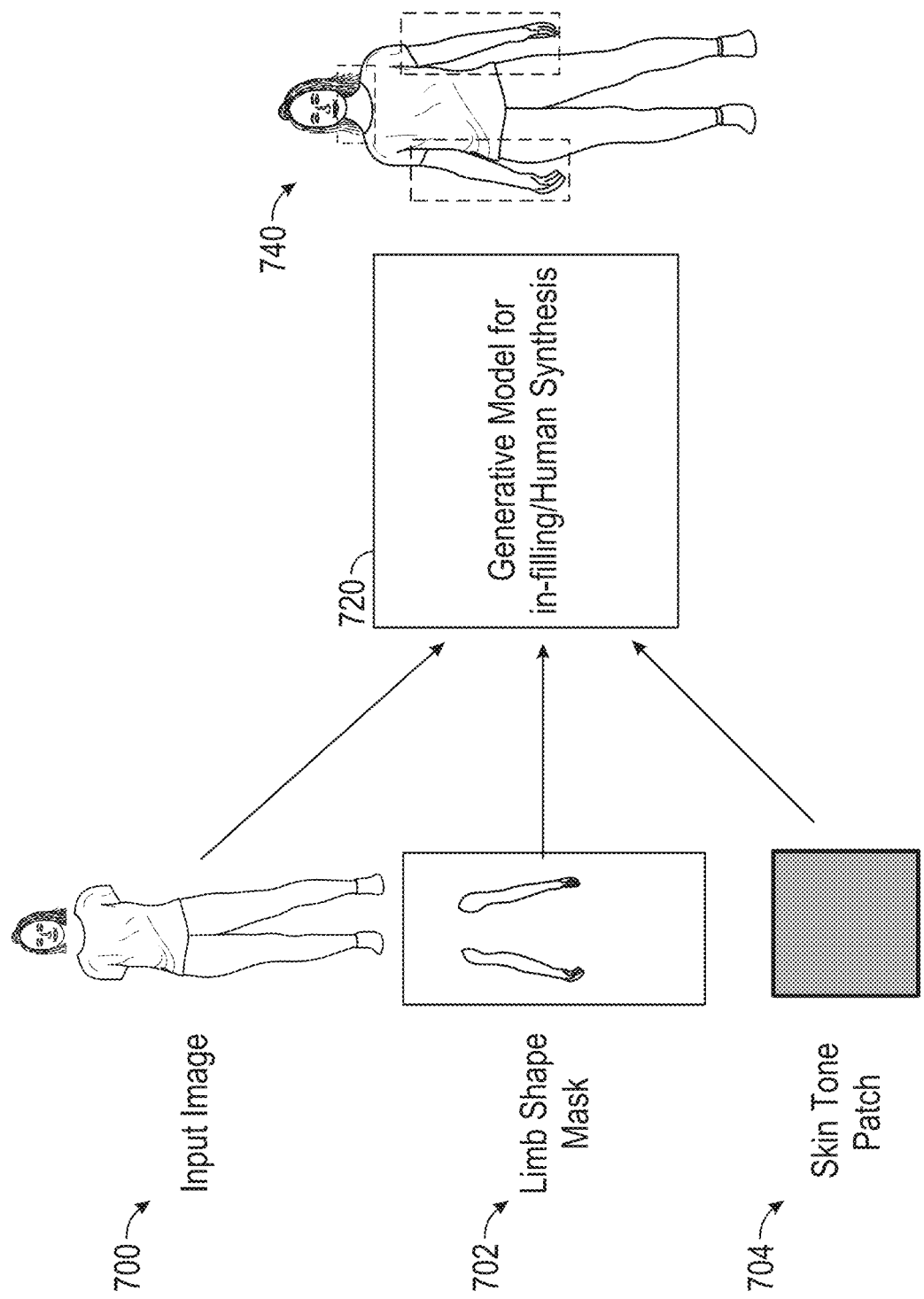
FIG. 7B illustrates a generative model-based approach for in-filling the stitched image of FIG. 7A to generate a virtual avatar, in accordance with various examples of the present disclosure.

FIG. 7B illustrates a generative model-based approach for in-filling the stitched image of FIG. 7A to generate a virtual avatar, in accordance with various examples of the present disclosure. As previously described, a conditional generative model (generative model for in-filling/human synthesis 720) may be used for the infilling/rendering task. Examples may include StyleGAN2, a conditional latent diffusion model, etc. The generative model may be trained for infilling conditioned on the input image 700, the limb shape mask 702, and the skin tone patch 704. More specifically, the generative model may infill the neck region of the input image 700 based on training examples it has seen of humans, and using the color in the skin tone patch 704 predicted by the machine learning architecture of FIG. 2A. One of the constraints for the generative model of FIG. 7B may be that pixels representing the user face and the SMPL model clothing from the input image 700 be preserved. However, the model may learn to in-fill the skin regions to connect the head to the body (e.g., in the neck region) and how to render the hair without occluding the clothing (i.e., without violating the hard constraints) based on training examples of humans seen during training. Limb shape mask 702 generated using the SMPL model's arms may be provided to guide the generative model in maintaining a realistic arm shape for the particular body while infilling this arm region using the skin tone patch 704. The generative model may blend skin tones according to natural variations and shadows, based on training images. For example, the generative model may render darker skin pixels under the chin of the user face to reflect a shadow that may naturally appear there.

Figure 7C:
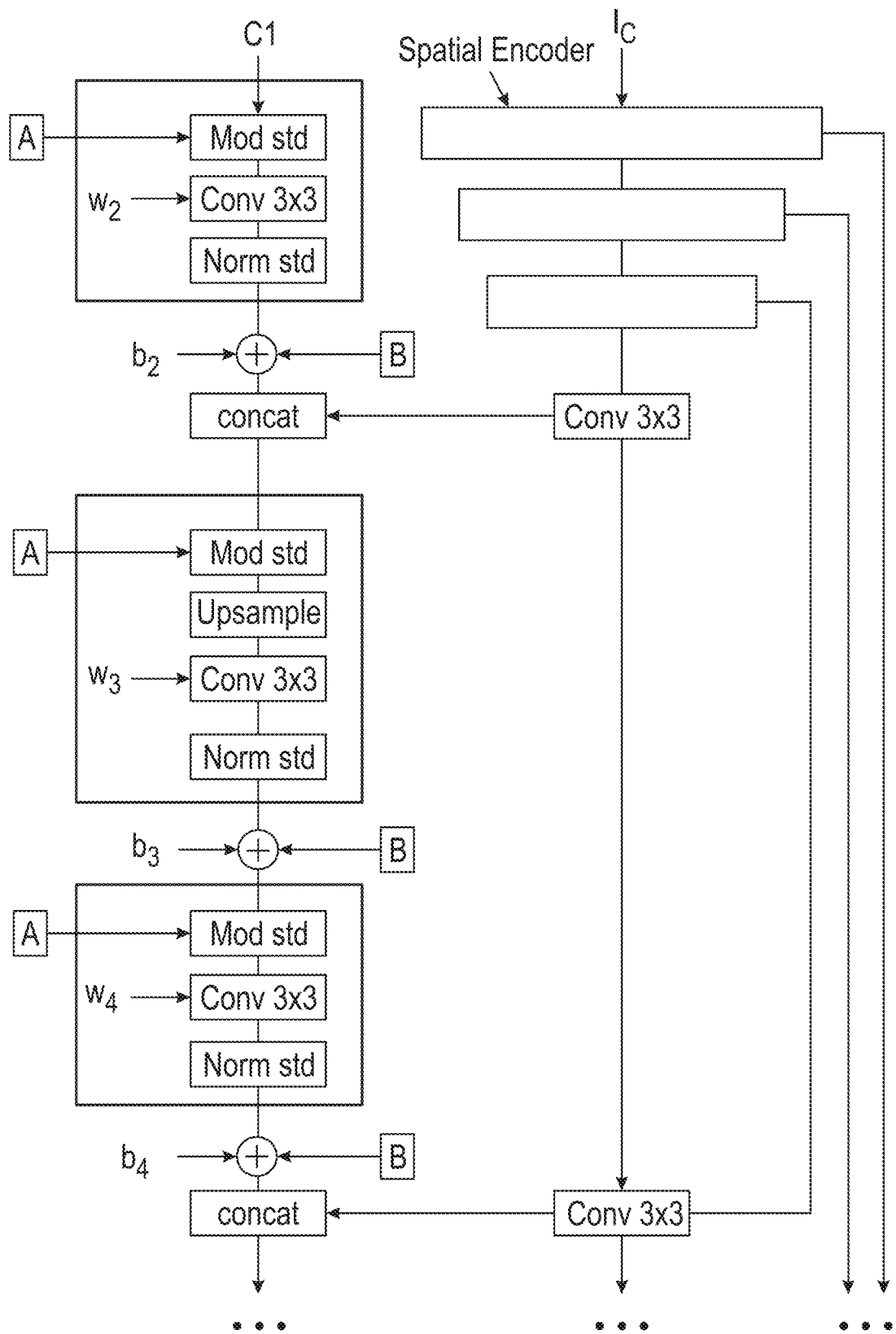
FIG. 7C depicts an example architecture of a generative model that may be used to generate the virtual avatar of FIG. 7B, in accordance with various techniques described herein.

FIG. 7C depicts an example architecture of a GAN architecture that may be used to generate the virtual avatar of FIG. 7B, in accordance with various techniques described herein. The example of FIG. 7C is a variation of StyleGAN2 modified to include a spatial encoder that may encode features from the user's face (e.g., face pixels from the selfie image), the generic model clothing, limb shape, and the partial hair in the input image 700. As shown, these features may be inserted into decoder blocks of the generator to assist in preserving these visual qualities in the output image 740 (FIG. 7B). Output image 740 represents an output 2D virtual avatar of the user, generated from the user's submitted selfie that may be used for virtual try-on of fashion items.

Figure 8:
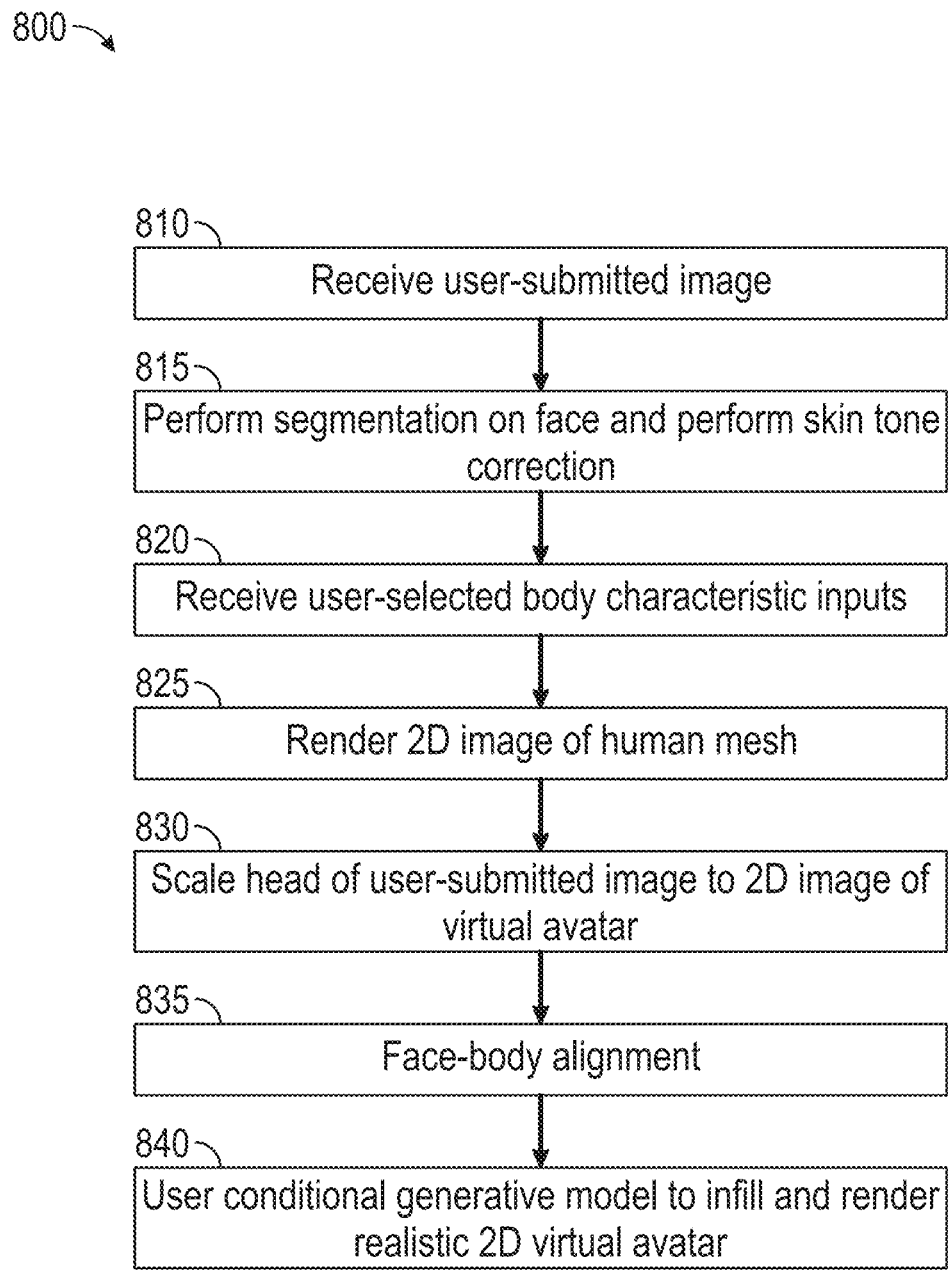
FIG. 8 is a flow chart depicting an example process for virtual avatar generation from user-submitted data, in accordance with various aspects of the present disclosure.

FIG. 8 is a flow chart depicting an example process for virtual avatar generation from user-submitted data, in accordance with various aspects of the present disclosure. Those portions of FIG. 8 that have been previously discussed in reference to FIGS. 1-7C may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 810, at which a user-submitted image (e.g., a selfie or other photo of the user) may be received. In various examples, an application used to generate the virtual avatar may prompt the user to take a selfie or upload an image of the user's face. As described, the techniques for virtual avatar generation described herein may generate a high quality avatar that includes a realistic representation of the user's face even when the selfie is captured under less than ideal lighting conditions.

Processing may continue at action 815, at which segmentation may be performed on the face and skin tone correction may be performed to account for poor lighting conditions. For example, pixels of the user's face may be updated as described above in reference to FIGS. 2A-2C. For example, if the user-submitted image is dark, it may cause the pixels representing the user's face to appear darker than the user's actual skin tone. Conversely, if the user-submitted image is over-exposed, it may cause pixels representing the user's face to appear lighter than the user's actual skin tone. Accordingly, the process described above in reference to FIGS. 2A-2C may generate a more realistic skin tone for face pixels representing the user's face.

Processing may continue at action 820, at which user-selected body characteristic inputs may be received. These body characteristics, such as height, weight, chest circumference, inseam measurement, hip measurement, etc., may be used to generate a virtual 3D human mesh (e.g., a SMPL model). In some examples, the interface for receiving the body characteristic inputs may request the user's height and/or weight and may provide sliders for other body characteristics (e.g., hip circumference). The interface may display an example 3D human mesh and the user may be able to see the 3D human mesh change as sliders are adjusted. This may enable a user to approximate their own measurements without needing to measure their hip circumference, inseam, etc., allowing for a more user-friendly experience for virtual avatar generation.

Processing may continue at action 825, at which a 2D image of the 3D human mesh may be rendered. In various examples, the 2D image may be rendered with a default skin and default clothes. Processing may continue at action 830, at which the head of the user-submitted image may be scaled according to the proportions of the 2D image of the virtual avatar rendered at action 825. The head (e.g., the portion of the image generated using the hair/face segmentation mask 223) may be scaled according to the techniques described above in reference to FIGS. 3A-C and FIG. 4.

Processing may continue at action 835, at which the scaled head may be aligned with the body of the virtual avatar in the 2D image. Various alignment approaches may be used. As an example, a center point of the user's head may be aligned with the SMPL model representation of the spine of the virtual avatar. Processing may continue at action 840, at which a conditional generative model may be used to infill missing skin pixels and hair to render a realistic 2D virtual avatar that includes the user's face/head. The generative model and the conditions/constraints are described above in reference to FIGS. 7A-7C.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating a two-dimensional (2D) virtual avatar, comprising:
receiving a first 2D image of a face from a mobile device;
determining, by inputting at least a portion the first 2D image of the face into a first neural network, a first skin tone of the face;
generating a first modified 2D image of the face by modifying first pixels of the first 2D image of the face using the first skin tone, wherein the first pixels represent skin portions of the first 2D image of the face;
generating, using a first segmentation model, first segmented image data comprising the first modified 2D image of the face and at least a portion of hair detected in the first 2D image of the face;
generating a (three-dimensional) 3D model of a virtual avatar using user-selected body characteristics using a Skinned Multi-Person Linear Model (SMPL), wherein the 3D model comprises a generic head;
generating a second 2D image representing the 3D model by rendering the 3D model from a first perspective;
determining a first width in pixels for an iris detected in the face in the first 2D image;
converting the first width into units of length using a predefined iris width in the units of length;
determining a first face width of the face in the first 2D image in the units of length using the first width;
generating scaled segmented image data by scaling the first segmented image data using a scaling factor, wherein the scaling factor is determined based on a target face width in pixels and a second face width of the face in the first 2D image in pixels, wherein the target face width is determined using the first face width of the face in the units of length; and generating the 2D virtual avatar comprising the scaled segmented image data stitched to a body of the second 2D image.

2. The method of claim 1, further comprising:
generating an in-filled image of the 2D virtual avatar using a conditional generative adversarial network (GAN), wherein the conditional GAN is conditioned on the first skin tone, first mask data representing arms of the 3D model, and an image of the scaled segmented image data stitched to the body of the second 2D image.

3. The method of claim 2, further comprising controlling the conditional GAN to generate the in-filled image such that a rendering of hair does not occlude image data representing clothing worn by the 3D model in the in-filled image.

4. A method comprising:
receiving first image data comprising an image of a first face and hair;
determining, using a first machine learning model, a predicted skin tone of skin of the first face;
generating modified first image data by modifying pixels representing the first face using the predicted skin tone;
generating, using a first segmentation model, first segmented image data representing the first face and at least a portion of the hair;
generating second image data representing a virtual avatar comprising a pre-defined head;
determining a first scale based on a width between a first set of two keypoints on a face of the virtual avatar in the second image data and a corresponding width between a second set of two keypoints on the first face;
determining a first number of pixels representing a width of the face of the virtual avatar by multiplying the first scale by a second number of pixels representing a width of the first face;
generating first scaled image data by scaling the first segmented image data based at least in part on the first number of pixels; and
generating third image data comprising the first scaled image data rendered on a body of the virtual avatar in the second image data.

5. The method of claim 4, further comprising:
generating, by a first generative machine learning model, fourth image data based on the third image data, wherein the first generative machine learning model in-fills an arm region and a neck region of the virtual avatar based on the predicted skin tone.

6. The method of claim 4, further comprising:
determining a first value by dividing the first number of pixels representing the width of the face of the virtual avatar by a third number of pixels representing a height of the virtual avatar; and
determining a first distance representing the width of the first face by multiplying the first value by a height of a person associated with the first face.

7. The method of claim 4, further comprising:
determining a face width representing a width of the first face based at least in part on a predefined width of a human iris;
determining a scaling factor based at least in part on the face width; and
generating the first scaled image data based at least in part on the scaling factor.

8. The method of claim 4, further comprising:
generating a first limb mask image masking out pixels of the second image data apart from limbs of the virtual avatar; and generating, by a first generative machine learning model, fourth image data based on the third image data, the predicted skin tone, and the first limb mask image, wherein the first generative machine learning model renders the limbs of the virtual avatar using the predicted skin tone.

9. The method of claim 4, further comprising:
generating fourth image data using a generative adversarial network (GAN) based at least in part on the third image data, wherein the GAN is controlled to generate the fourth image data such that a rendering of hair in the fourth image data does not occlude image data representing clothing worn by the virtual avatar in the fourth image data.

10. The method of claim 4, further comprising:
generating a first feature representation of the first image data using a convolutional neural network (CNN) based encoder; and
determining, using a first classifier head comprising at least a first fully-connected layer, the predicted skin tone using the first feature representation.

11. The method of claim 10, further comprising:
determining, using a second classifier head comprising at least a second fully-connected layer, a prediction of a magnitude of lighting used during capture of the first image data; and
determining, using a third classifier head comprising at least a third fully-connected layer, a prediction of a lighting direction used during capture of the first image data, wherein the modified first image data is further generated based at least in part on the prediction of the magnitude of lighting and the prediction of the lighting direction.

12. A system comprising:
at least one processor; and
non-transitory computer-readable memory storing instructions that, when executed by the at least one processor, are effective to:
receive first image data comprising an image of a user face and hair;
determine, using a first machine learning model, a predicted skin tone of skin of the user face;
generate modified first image data by modifying pixels representing the user face using the predicted skin tone;
generate, using a first segmentation model, first segmented image data representing the user face and at least a portion of the hair;
generate second image data representing a virtual avatar comprising a pre-defined head;
determine a first scale based on a width between a first set of two keypoints on a face of the virtual avatar in the second image data and a corresponding width between a second set of two keypoints on the user face;
determine a first number of pixels representing a width of the face of the virtual avatar by multiplying the first scale by a second number of pixels representing a width of the user face;
generate first scaled image data by scaling the first segmented image data based at least in part on the first number of pixels; and
generate third image data comprising the first scaled image data rendered on a body of the virtual avatar in the second image data.

13. The system of claim 12, the non-transitory computer-readable memory storing further instructions that, when executed by the at least one processor, are further effective to:
   generate, by a first generative machine learning model, fourth image data based on the third image data, wherein the first generative machine learning model in-fills an arm region and a neck region of the virtual avatar based on the predicted skin tone.

14. The system of claim 13, the non-transitory computer-readable memory storing further instructions that, when executed by the at least one processor, are further effective to:
   determine a first value by dividing the first number of pixels representing the width of the face of the virtual avatar by a second number of pixels representing a height of the virtual avatar; and
   determine a first distance representing the width of the user face by multiplying the first value by a height of the user.

15. The system of claim 12, the non-transitory computer-readable memory storing further instructions that, when executed by the at least one processor, are further effective to:
   determine a face width representing a width of the user face based at least in part on a predefined width of a human iris;
   determine a scaling factor based at least in part on the face width; and
   generate the first scaled image data based at least in part on the scaling factor.

16. The system of claim 12, the non-transitory computer-readable memory storing further instructions that, when executed by the at least one processor, are further effective to:
   generate a first limb mask image masking out pixels of the second image data apart from arms of the virtual avatar; and
   generate, by a first generative machine learning model, fourth image data based on the third image data, the predicted skin tone, and the first limb mask image, wherein the first generative machine learning model renders the arms of the virtual avatar using the predicted skin tone.

17. The system of claim 12, the non-transitory computer-readable memory storing further instructions that, when executed by the at least one processor, are further effective to:
   generate fourth image data using a generative adversarial network (GAN) based at least in part on the third image data, wherein the GAN is controlled to generate the fourth image data such that a rendering of hair in the fourth image data does not occlude image data representing clothing worn by the virtual avatar in the fourth image data.

18. The system of claim 12, the non-transitory computer-readable memory storing further instructions that, when executed by the at least one processor, are further effective to:
   generate a first feature representation of the first image data using a convolutional neural network (CNN) based encoder; and
   determine, using a first classifier head comprising at least a first fully-connected layer, the predicted skin tone using the first feature representation.

* * * * *